(12) United States Patent
Thibault (10) Patent No.: US 6,926,109 B2
(45) Date of Patent: Aug. 9, 2005

(54) HYDROSTATIC MOTOR DRIVE MOUNT

(75) Inventor: Jonathan Thibault, Verdun (CA)

(73) Assignee: Camoplast Industrial Inc., Sherbrooke (CA)

( * ) Notice: Subject to any disclaimer, the term of this patent is extended or adjusted under 35 U.S.C. 154(b) by 80 days.

(21) Appl. No.: 10/318,381

(22) Filed: Dec. 13, 2002

(65) Prior Publication Data

US 2003/0116365 A1 Jun. 26, 2003

Related U.S. Application Data

(60) Provisional application No. 60/339,101, filed on Dec. 13, 2001, and provisional application No. 60/382,032, filed on May 22, 2002.

(51) Int. Cl.$^7$ .............................................. B62M 15/00
(52) U.S. Cl. ........................ 180/195; 180/9.44; 180/383
(58) Field of Search ............................... 180/9.44, 6.54, 180/6.7, 9.1, 9.42, 9.54, 190, 192, 195, 383; 403/359.1, 359.2, 359.4, 359.6; 192/69.91, 69, 97

(56) References Cited

U.S. PATENT DOCUMENTS

| | | | | |
|---|---|---|---|---|
| 2,802,555 A | * | 8/1957 | Kalikow | 192/24 |
| 2,821,277 A | * | 1/1958 | Hughes | 192/69.91 |
| 4,453,852 A | * | 6/1984 | Gilcrest | 403/1 |
| 4,552,544 A | * | 11/1985 | Beckman et al. | 464/162 |
| 4,895,470 A | * | 1/1990 | Scherzinger | 403/25 |
| 4,998,591 A | * | 3/1991 | Zaunberger | 180/6.44 |
| 5,076,378 A | * | 12/1991 | Lagace | 180/9.1 |
| 5,186,692 A | * | 2/1993 | Gleasman et al. | 475/82 |
| 5,261,801 A | * | 11/1993 | Stone | 418/69 |
| 5,899,307 A | * | 5/1999 | Zaun et al. | 192/69.43 |
| 5,980,225 A | * | 11/1999 | Sommer | 418/104 |
| 6,139,216 A | * | 10/2000 | Bertetti | 403/359.3 |
| 6,139,458 A | * | 10/2000 | Simmons | 475/83 |
| 6,234,907 B1 | * | 5/2001 | Moser | 464/134 |
| 6,286,620 B1 | * | 9/2001 | Legman et al. | 180/374 |
| 6,327,934 B1 | * | 12/2001 | Barthel | 74/607 |
| 6,374,933 B1 | * | 4/2002 | Ruppert et al. | 180/9.48 |

* cited by examiner

Primary Examiner—J. Allen Shriver
(74) Attorney, Agent, or Firm—Pillsbury Winthrop Shaw Pittman LLP (57) ABSTRACT

A tracked vehicle includes a track operatively connected to a driveshaft. An output shaft of a hydrostatic motor is selectively rotationally engaged with the driveshaft via a clutch mechanism. When the clutch mechanism is engaged, the motor drives the track. When the clutch mechanism is disengaged, the tracked vehicle may be towed without rotating the output shaft of the motor. The clutch mechanism includes splined surfaces on the driveshaft and output shaft that are adapted to rotationally engage a splined surface of an axially-movable clutch shaft. The clutch mechanism further includes an engagement controller that selectively axially moves the clutch shaft into and out of rotational engagement with the output shaft while maintaining continuous rotational engagement between the clutch shaft and the driveshaft.

15 Claims, 4 Drawing Sheets

HYDROSTATIC MOTOR DRIVE MOUNT

CROSS-REFERENCE

This application claims the benefit of priority to U.S. Provisional Patent Application No. 60/339,101, titled "HYDROSTATIC MOTOR DRIVE MOUNT," filed on Dec. 13, 2001, and U.S. Provisional Patent Application No. 60/382,032, titled "HYDROSTATIC MOTOR DRIVE MOUNT," filed on May 22, 2002, both of which are incorporated herein by reference.

BACKGROUND OF THE INVENTION

1. Field of the Invention

The present invention relates to mechanisms for mounting hydrostatic motors to the drive systems of hydrostatic-motor-driven vehicles. The invention also relates to hydrostatic motors used to drive a tracked vehicle.

2. Description of Related Art

Hydrostatic motors are commonly used to drive the tracks of tracked vehicles. The low-speed, high-torque output of hydrostatic motors permits them, in many cases, to be rotationally fixed directly to the driveshaft of a track without the need for intermediate gear reduction systems. Such a tracked vehicle includes a source of pressurized hydraulic fluid (such as an internal combustion engine and hydraulic fluid pump) that is selectively connected to the input and output ports of the hydrostatic motor(s) to propel the vehicle. Typically, one or more hydrostatic motors are connected to each of the vehicle's two parallel tracks.

Brakes are typically provided for such a tracked vehicle in order to selectively prevent the tracks from rotating. The brakes may be connected directly to the output shafts of each of the hydrostatic motors, which are, in turn, directly connected to the driveshafts and tracks of the vehicle. For safety, such brakes are typically passively-engaging brakes that only disengage when an active power source is applied to them. As a result, if the vehicle's power source fails, the brakes engage to prevent unintentional, uncontrolled movement of the disabled vehicle.

In addition to the regular brakes, when hydraulic fluid is not permitted to enter or exit the hydraulic fluid ports of the hydrostatic motors (typically when the motors are not being driven), the hydrostatic motors function like positive-displacement pumps and resist rotation. As a result, the hydrostatic motors function as additional braking mechanisms for the tracked vehicle.

It is sometimes necessary to pull or tow a tracked vehicle. For example, when a vital component fails, such as the power source, the tracked vehicle loses power and must be towed to a location where it can be repaired. Unfortunately, when the vehicle must be capable of being towed (i.e., when the power source fails), both the brakes and the hydrostatic motors passively resist the tracks' rotation. Further, forcefully rotating the tracks and thus the hydrostatic motors, such as is required when the conventional tracked vehicle is towed, tends to wear and damage the hydrostatic motors and hydraulic fluid system.

Systems have been developed to address the above deficiencies. For example, one conventional partial-disengagement system for hydrostatic motors allows the hydrostatic motors to be partially disengaged from the tracks of the vehicle to facilitate towing. This conventional system includes a combination of three required features. First, a release mechanism is provided for selectively releasing the brakes. However, if the release system is a passively-engaging system, a second power source must be provided so that the power source failure that necessitated the towing does not also prevent the brake release mechanism from functioning. Second, a system is provided for selectively retracting the pistons within the hydrostatic motors so that the piston rollers do not knock against the motor cams while the vehicle is being towed and the tracks and engaged hydrostatic motors are consequently rotated. Third, a bypass valve is provided for directly operatively linking the input and output ports of the motors. As the motors rotate and function as hydrostatic pumps, hydraulic fluid simply circulates through the motors. As the preceding description illustrates, the conventional partial-disengagement system is both complex to create and complicated to use. The system also requires additional components that increase the cost of manufacture and maintenance.

Accordingly, there is a need for a less complicated and lower cost method for disengaging a hydrostatic motor from a drive shaft, especially during a towing operation.

SUMMARY OF THE INVENTION

An aspect of embodiments of the invention is to provide a disengagement system that is easy to use in the field.

Another aspect of embodiments of the invention is to provide a low cost mechanism for disengaging a hydrostatic motor from a driven component.

A further aspect of embodiments of the invention is to provide a system for completely operatively disengaging a hydrostatic motor from a driven component.

A further aspect of embodiments of the invention is to provide a mechanical disengagement system for a hydrostatic motor and a driven component. The use of such a mechanical system reduces the risk of failure relative to conventional hydraulic disengagement systems. The mechanical disengagement system is also simpler to use, requires less maintenance, and is simpler to service than the conventional hydrostatic systems.

According to one aspect of the present invention, a vehicle has a hydrostatic motor mounted to a frame. The hydrostatic motor has an output shaft. A drive system is also supported by the frame. A driveshaft is connected to the drive system. A clutch mechanism is disposed between the output shaft and the driveshaft. The clutch mechanism has (a) an engaged position in which the driveshaft and the output shaft are rotationally engaged with each other, and (b) a disengaged position in which the driveshaft and the output shaft are rotationally disengaged from each other. The present invention is also directed toward the hydrostatic motor mounting assembly, per se.

According to an additional aspect of the above-described vehicle, the driveshaft and the output shaft have a common rotational axis. A first and second axially-extending splines are disposed on the driveshaft and the output shaft, respectively. A clutch shaft having a third axially-extending spline is selectively movable along the rotational axis such that the first and second splines rotationally engage the third spline when the clutch mechanism is in the engaged position, and the third spline disengages from one of the first and second splines when the clutch mechanism is in the disengaged position.

According to a further alternative aspect of the present invention, a motor mounting assembly is provided with a low speed, high torque motor having an output shaft. A driveshaft is selectively rotationally connected to the output shaft. A disengaging mechanism is connected between the output shaft and the driveshaft. The disengaging mechanism includes an axially moveable shaft engageable between the output shaft and the driveshaft, a connecting rod coupled between the moveable shaft and the driveshaft, a biasing mechanism secured to the driveshaft and the connecting rod that biases the moveable shaft toward the output shaft, and an engagement device coupled to the connecting rod to selectively move the connecting rod relative to the driveshaft, to thereby selectively engage and disengage the driveshaft and the output shaft.

Additional and/or alternative aspects, features, and advantages of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION OF PREFERRED EMBODIMENTS OF THE INVENTION

Figure 1A:
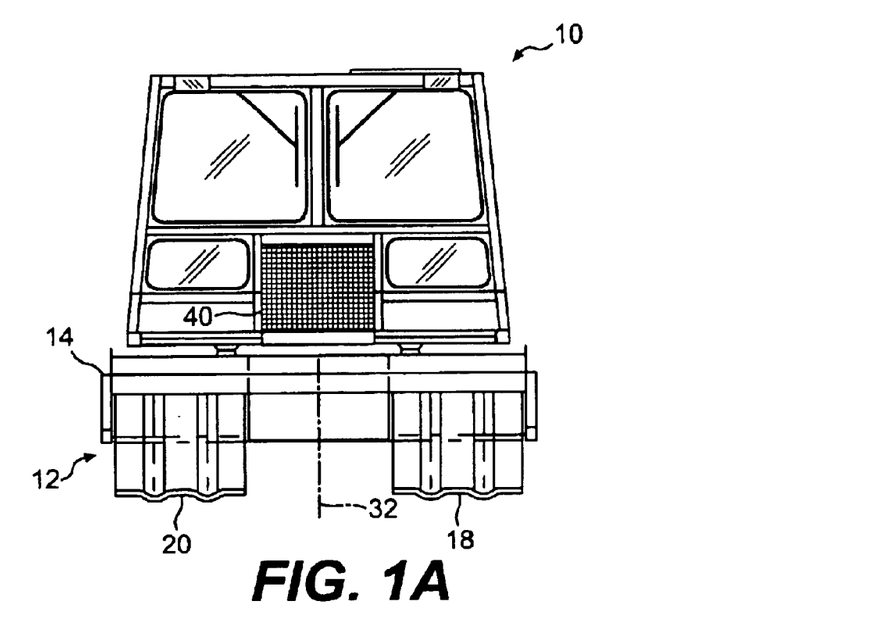
FIG. 1A is a front view of a tracked vehicle according to the present invention.
Figure 1B:
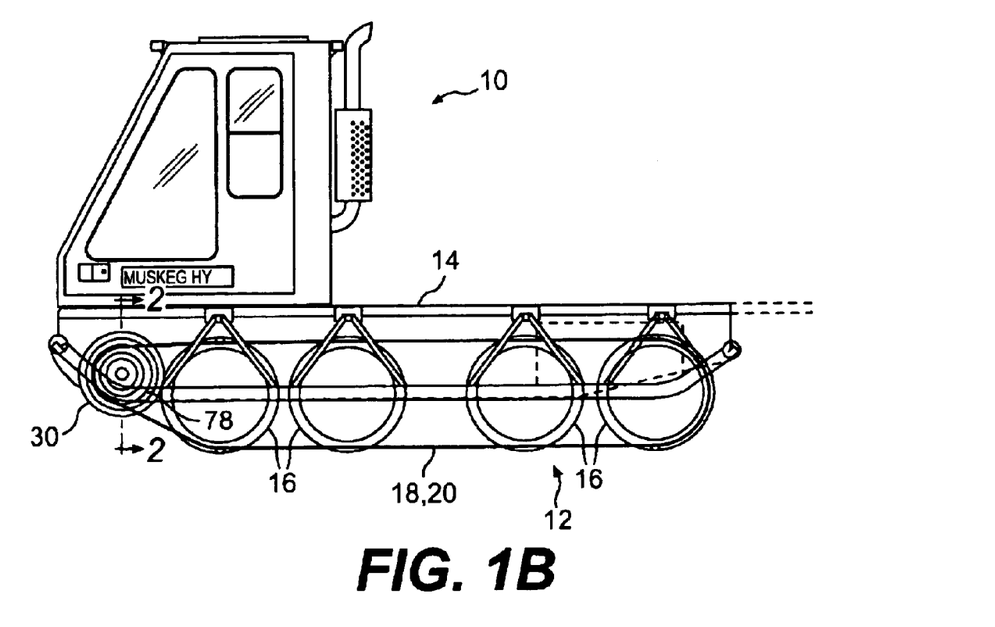
FIG. 1B is a side view of the tracked vehicle according to the present invention.

FIGS. 1A and 1B illustrate a tracked vehicle 10 according to a preferred embodiment of the present invention. This invention is described as implemented in a tracked vehicle for purposes of illustration. It is to be understood that the mounting system could be used on any hydrostatic motor and driveshaft in any application in which a selectively-disengageable hydrostatic motor drive system would be advantageous.

A drive system 12 having a power source is mounted to a frame 14 of the vehicle 10. The drive system 12 preferably includes a plurality of track wheels 16 rotatably supported by the frame 14. Right and left continuous tracks 18, 20 are mounted onto the wheels 16. The tracks 18, 20 are operatively connected to a driving mechanism 30. When the driving mechanism 30 drives the tracks 18, 20 around the wheels 16, the tracks 18, 20 engage the ground drive the vehicle 10. Any type of tracks can be employed including, for example, tracks used on snow grooming vehicles or construction-type earth-moving equipment. As such track systems are conventional, no further explanation is necessary.

While the drive system 12 illustrated in the preferred embodiment is a dual-track system, various other drive systems could be used without departing from the scope of the present invention. For example, the vehicle may be a wheeled vehicle instead of a tracked vehicle such that the drive system comprises rotatably mounted wheels instead of dual tracks.

Because the left and right sides of the driving mechanism 30 are symmetrical with respect to a centerline 32 of the vehicle 10, only the right side of the driving mechanism 30 will be described in detail. Nonetheless, the description of the right side of the driving mechanism 30 applies equally to the left side.

Figure 2:
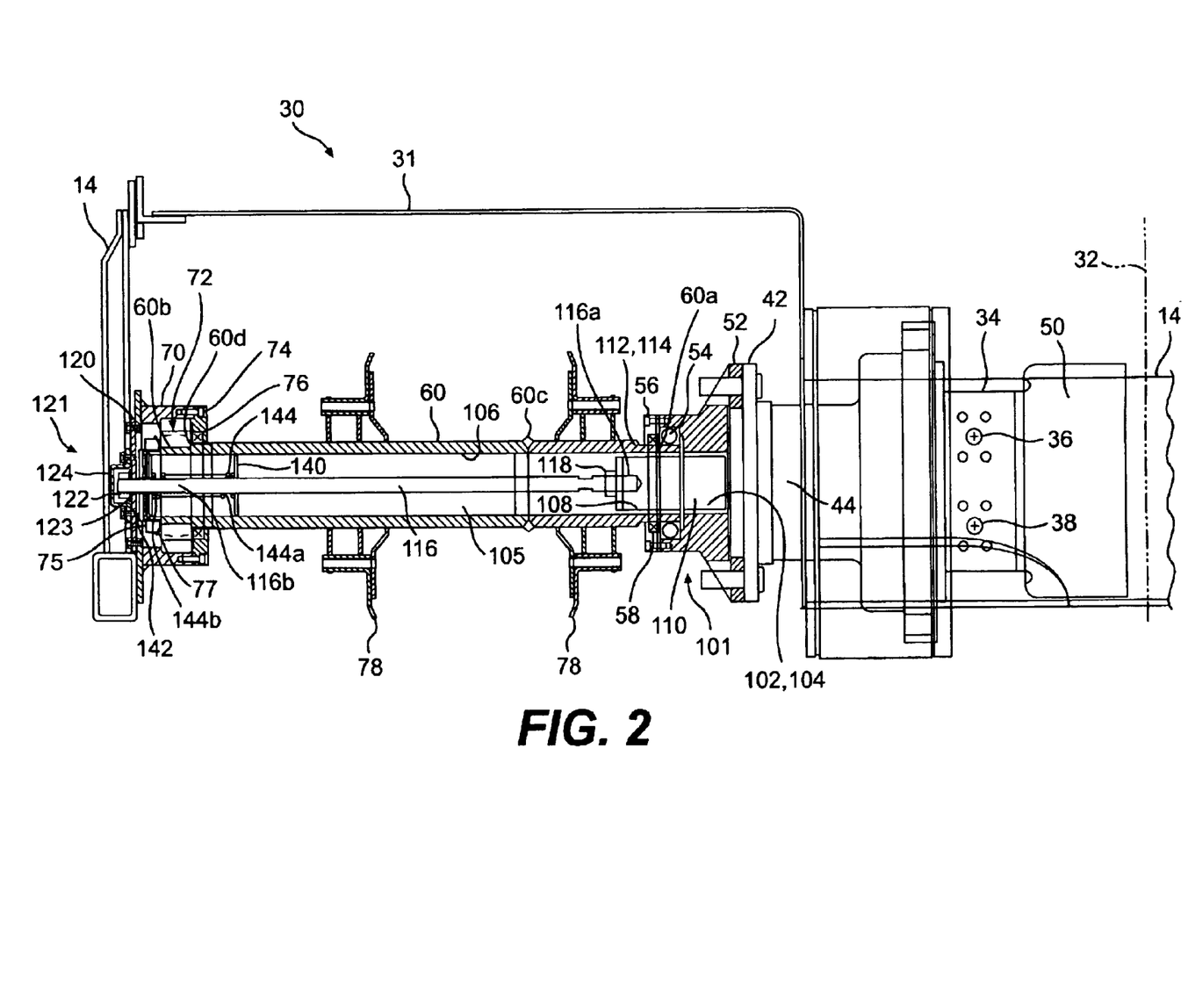
FIG. 2 is a partial, enlarged cross-sectional side view of the mounting system of the tracked vehicle taken along the line 2—2 in FIG. 1B.

As seen in detail in FIG. 2, the driving mechanism 30 is supported by the frame 14. A mud guard 31 is preferably mounted to the frame 14 above the tracks 18, 20 to prevent mud and other debris from splashing up from the tracks 18, 20 during operation of the vehicle 10. The driving mechanism 30 includes a hydrostatic motor 34 mounted to the frame 14 of the vehicle 10. Inlet and outlet ports 36, 38 of the motor 34 are selectively connected to a source 40 of pressurized hydraulic fluid (shown schematically in FIG. 1). The source 40 preferably includes an internal combustion engine connected to a hydraulic fluid pump and fluid reservoir. A conventional hydrostatic control circuit is used to selectively actuate the hydrostatic motor 34.

The hydrostatic motor 34 includes an output shaft 42 with a flange that is driven by the hydrostatic motor 34 about a rotational axis 44. While the disclosed output shaft 42 is directly connected to the motor 34, various intermediary components, such as gears or other known elements, may be disposed between the motor 34 and the output shaft 42 without departing from the scope of the present invention. A brake 50 connected to the output shaft 42 selectively prevents the output shaft 42 from rotating, as is known in the art.

While the described embodiment employs a hydrostatic motor 34, it is to be understood that the output shaft 42 could be drivingly connected to any type of rotational-output power source such as an electric motor, a hydrostatic motor, or an internal combustion engine without departing from the scope of the present invention. The mounting arrangement described herein is particularly well suited for a low speed, high torque motor. The low speed, high torque rotational output commonly enables such motors to be connected directly to driveshafts without the need for intermediary gear reduction mechanisms.

As an overview, the hydrostatic motor 34 drives the vehicle drive shaft 60 via output shaft 42. The driveshaft 60 is supported by a drive hub 52 connected to the output shaft 42 at one end 60a and a bearing housing 70 connected to the frame 14 at the other end 60b.

The drive hub 52 is fastened to the flange of the output shaft 42, with bolts for example. A deep-groove, annular bearing 54 is positioned within a bore in the hub 52. A drive hub cover 56, which is fastened (preferably with bolts) to the drive hub 52, holds the bearing 54 in place. An inner radial seal 58 is positioned between the drive hub cover 56 and the bearing 54 to protect and seal the bearing 54 and discourage debris from migrating into the bearing 54 from the ambient environment.

The driveshaft 60 has a first end 60a with a narrowed diameter that extends through an aperture in the drive hub cover 56, within the inner radial seal 58 and the bearing 54, into the bore in the hub 52. In the illustrated embodiment, the driveshaft 60 comprises two axially-aligned pieces that are welded together at weld 60c. However, the driveshaft according to the present invention may also be one-piece or multi-piece.

The bearing housing 70 is mounted to the frame 14 at the other end of the driveshaft 60. A roller bearing 72 is mounted within the bearing housing 70. The roller bearing 72 is preferably a spherical roller bearing, but may alternatively comprise any of a variety of other types of bearings or combinations of bearings that are capable of preventing the driveshaft 60 from moving axially or radially while allowing the driveshaft 60 to rotate freely. A bearing housing cover 74 is mounted (preferably using bolts) to the bearing housing 70 to hold the bearing 72 in place. An outer radial seal 76 is disposed in an inner recess in the bearing housing cover 74 adjacent to the bearing 72 to protect and seal the bearing 72 and to discourage debris from migrating into the bearing housing 70 from the ambient environment. A second end 60b of the driveshaft 60, which has a narrowed, threaded outer diameter, extends through an aperture in the bearing housing cover 74, within the outer radial seal 76 and the bearing 72, such that the driveshaft 60 can rotate relative to the bearing housing about the axis 44. A bearing locknut 75 and lock washer 77 are threaded onto the second end 60b and abut against the bearing 72 to prevent the driveshaft 60 from moving axially to the right (as seen in FIG. 2) relative to the bearing 72 and the frame 14. A shoulder 60d of the driveshaft 60 formed at the inner axial end of the narrowed-diameter second end 60b abuts against the bearing 72 to prevent the driveshaft 60 from moving axially to the left (as seen in FIG. 2) relative to the bearing 72 and the frame 14.

A sprocket assembly 78 is rigidly mounted to the driveshaft 60. As illustrated in FIG. 1B, the track 20 is mounted onto the sprocket assembly 78 such that the track 20 is driven when the sprocket assembly 78 and driveshaft 60 are rotated. While the driveshaft 60 is directly connected to the track 20 via the sprocket assembly 78, various intermediary components such as gears and belt drives may be disposed between the driveshaft 60 and the track 20 without departing from the scope of the present invention.

A disengaging mechanism according to the present invention is described with reference to FIG. 2. The disengaging mechanism includes a clutch mechanism that selectively engages the driveshaft 60 and the output shaft 42. In this embodiment, the clutch mechanism includes a disengageable clutch portion 101 operatively connected to and controlled by an engagement controller 121.

The disengageable clutch portion 101 creates a disengageable operative connection between the driveshaft 60 and the drive hub 52. The clutch portion 101 includes a splined, axially-movable clutch shaft 110 that selectively engages the driveshaft 60 and the drive hub 52.

The drive hub 52 has an axially extending bore with an inner annular surface 102. The plurality of axially-extending splines 104 are disposed along the inner surface 102. The driveshaft 60 is tubular with an inner bore 105 having an inner surface 106. The plurality of axially-extending splines 108 are disposed along the inner surface 106 at least at the first end 60a of the driveshaft 60. The axially-movable clutch shaft 110 connects the driveshaft 60 to the drive hub 52. The clutch shaft 110 is disposed within the bore 102 of the drive hub 52 and has an outer surface 112 that includes a plurality of splines 114. The splines 114 are constructed to engage the splines 104 of the drive hub 52 and the splines 108 of the driveshaft 60. When a portion of the splines 114 of the clutch shaft 110 are disposed at the same axial position along the axis 44 as at least a portion of the splines 104 of the drive hub 52, the drive hub 52 of the output shaft 42 rotationally engages the clutch shaft 110. Similarly, when a portion of the splines 114 of the clutch shaft 110 are disposed at the same axial position along the axis 44 as at least a portion of the splines 108 of the driveshaft 60, the clutch shaft 110 rotationally engages the driveshaft 60. By this rotational engagement, rotation of the output shaft 42 is transmitted to the driveshaft 60.

The engagement controller 121 includes an axially-extending disengaging rod (or connecting rod) 116 that extends within the bore 105 of the driveshaft 60 and operatively connects the clutch portion 101 to the engagement controller 121. The disengaging rod 116 includes a first end 116a rigidly connected to the clutch shaft 110. In the illustrated embodiment, the first end 116a is threaded into a threaded hole in the clutch shaft 110. A lock nut 118 is threaded onto the first end 116a and tightened against the clutch shaft 110 to secure the connection. While the disengaging rod 116 and clutch shaft 110 comprise separate pieces in the illustrated embodiment, they could also comprise an integral rod/clutch piece without departing from the scope of the present invention.

At the other end of the driveshaft 60 and disengaging rod 116, a bearing housing access plate 120 is fastened (preferably with bolts) onto an end of the bearing housing 70 opposite the bearing housing cover 74 such that the access plate 120 is connected via the bearing housing 70 to the driveshaft 60 at a fixed axial position relative to the output shaft 42. The access plate 120 includes a hole through which a second end 116b of the disengaging rod 116 extends.

The engagement controller 121 selectively controls the clutch portion 101 by controlling the axial position of the clutch shaft 110. In this embodiment, the engagement controller 121 includes a disengaging member in the form of a disengaging nut 122. The disengaging nut 122 is preferably threaded onto the second threaded end 116b of the disengaging rod 116 on the outside of the bearing housing access plate 120 (left side as illustrated in FIG. 2). A low-friction washer 123 is preferably disposed between the disengaging nut 122 and the access plate 120 to reduce friction when the disengaging nut 122 is rotated on the second threaded end 116b about the axis 44 relative to the access plate 120. A removable nut protector 124 in the form of a cap, for example, is fastened (preferably with bolts) onto the access plate 120 to enclose and protect the disengaging nut 122.

Although the illustrated engagement controller 121 includes a disengaging nut 122 threaded onto a disengaging rod 116, various other engagement controllers may be used without departing from the scope of the present invention. For example, the disengaging member may be a snap ring or other axially lockable device that selectively fits onto a plurality of axially-spaced circumferential grooves formed on the disengaging rod 116. Alternatively, the disengaging member may be a pinion gear that meshes with axially-spaced teeth on the disengaging rod 116.

A first stop member in the form of a first disc (or a washer and snap-ring) 140 is disposed at a fixed axial position along the disengaging rod 116 relative to the clutch shaft 110. A second stop member in the form of a second disc (or a washer and a snap-ring) 142 is disposed around the disengaging rod 116 and is connected to an end of the driveshaft 60 at a fixed axial position relative to the driveshaft 60. The second disc 142 can be welded onto, threaded to, or clamped to the end 60b of the driveshaft 60, for example. A reengagement spring 144 is fit over the disengaging rod 116 between the discs 140, 142 such that first and second ends 144a, 144b of the spring 144 engage the first and second discs 140, 142, respectively. Alternatively, the second disc 142 may be omitted and the reengagement spring 144 may be disposed between the access plate 120 and the first disc 140 with an intermediate low-friction washer separating the spring 144 from the access plate 120.

While in the illustrated embodiment the spring 144 comprises a compression spring, the spring 144 may also be any other type of resilient member or biasing mechanism that would be known to one of ordinary skill in the art to be able to bias the clutch shaft 110 toward the output shaft 42. Because the spring 144 is compressed between the discs 140, 142, the spring 144 tends to axially push the disengaging rod 116, and thus the attached clutch shaft 110, into engagement with the drive hub 52 of the output shaft 42 (toward the right as illustrated in FIG. 2).

The operation of the clutch mechanism according to the present invention is described with reference to FIG. 2. FIG. 2 illustrates the engaged position of the clutch mechanism, in which the output shaft 42 and driveshaft 60 are rotationally engaged with each other via their respective engagements with the clutch shaft 110. The clutch mechanism functions by selectively axially moving the clutch shaft 110 into and out of rotational engagement with the output shaft 42 while maintaining continuous rotational engagement between the clutch shaft 110 and the driveshaft 60. Alternatively, the clutch mechanism may function by selectively axially moving the clutch shaft 110 into and out of rotational engagement with the driveshaft 60 while maintaining continuous rotational engagement between the clutch shaft 110 and the output shaft 42.

To disengage the clutch mechanism (i.e. rotationally disengage the output shaft 42 from the driveshaft 60), an operator removes the nut protector 124 and rotates the nut 122 in a disengaging direction (clockwise if the nut 122 and the second threaded end 116b have standard right-hand threads) to move the nut 122 in a direction toward the clutch shaft 110. Because the access plate 120 prevents the nut 122 from moving to the right as seen in FIG. 2, disengaging rotation of the nut 122 relative to the disengaging rod 116 forces the rod 116 to move to the left thereby compressing the spring 144. In turn, this forces the clutch shaft 110 to move to the left and eventually out of engagement with the drive hub 52 of the output shaft 42. The rotational engagement between the clutch shaft 110 and the driveshaft 60 prevents the disengaging rod 116 from rotating in common with the disengaging nut 122 when the disengaging nut 122 is rotated.

To engage the clutch mechanism (i.e. rotationally engage the output shaft 42 with the driveshaft 60), the operator rotates the disengaging nut 122 in an engaging direction (counterclockwise if nut 122 and the second threaded end 116b have standard right-handed threads) thereby releasing the disengaging rod 116 in a direction toward the clutch shaft 110. This allows the compressed spring 144 to press the disc 140 and thus the disengaging rod 116 and the clutch shaft 110 into engagement with the drive hub 54. If the splines 104 of the drive hub 52 are not properly aligned with the splines 114 of the clutch shaft 110 when the spring 144 urges the clutch shaft 110 into engagement with the drive hub 52, the clutch shaft 110 pushes toward the drive hub 52 and engages once the driveshaft 60 or output shaft 42 are rotated enough to align the splines 104, 114. In practice, the alignment process may be completed by moving the tracks 18, 20 a small amount to slightly rotate the attached driveshaft 60. It should be noted that the greater the number of splines 104, 108, 114 that are included on the drive hub 52, driveshaft 60, and clutch shaft 110, respectively, the less the driveshaft must be rotated in order to align the splines 104, 114. After the clutch shaft 110 engages the drive hub 52, the operator can bolt (or otherwise fasten) the nut protector 124 onto the access plate 120.

Figure 3:
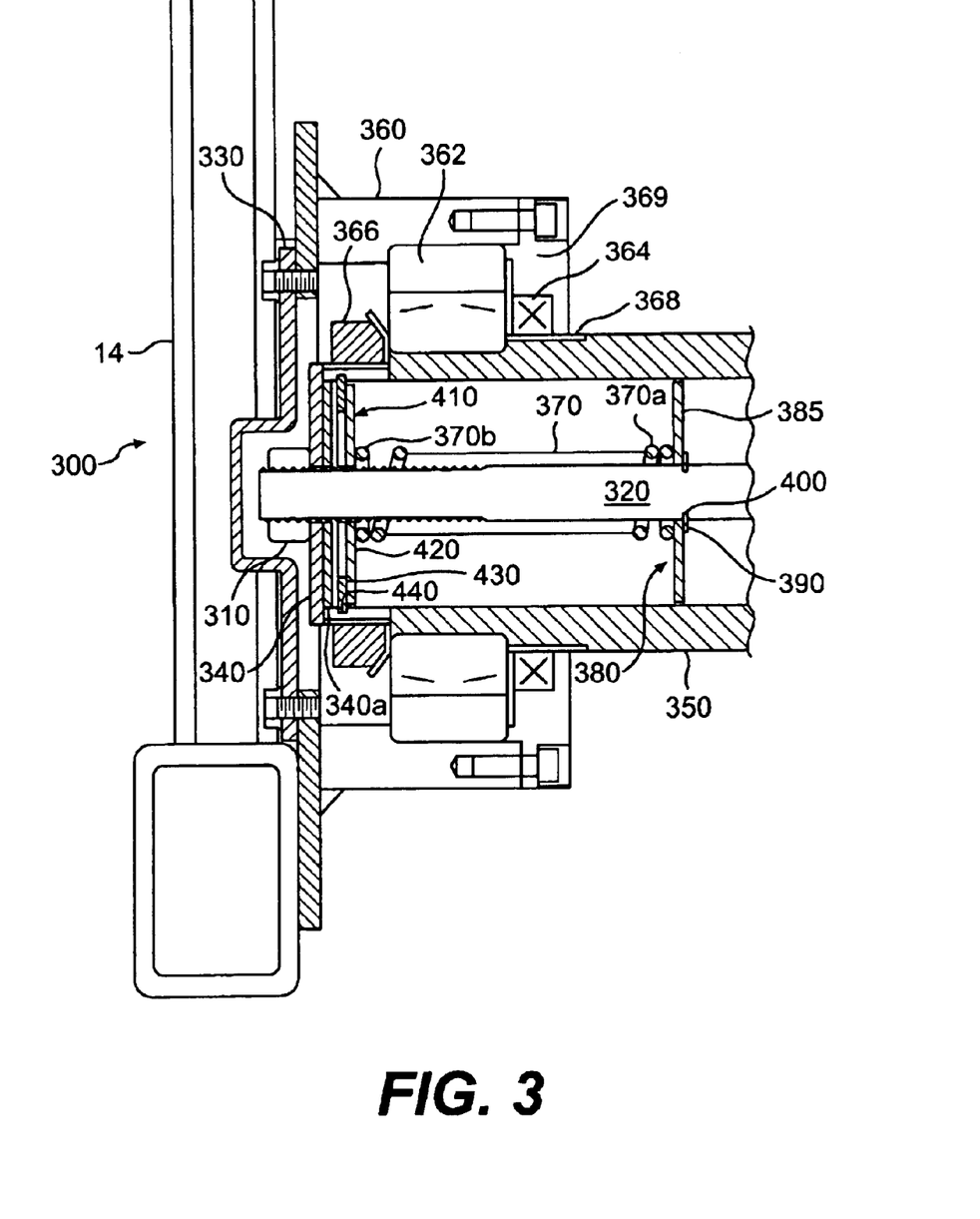
FIG. 3 is a partial, enlarged cross-sectional side view of an engagement controller in an engaged position according to a preferred alternative embodiment of the present invention.
Figure 4:
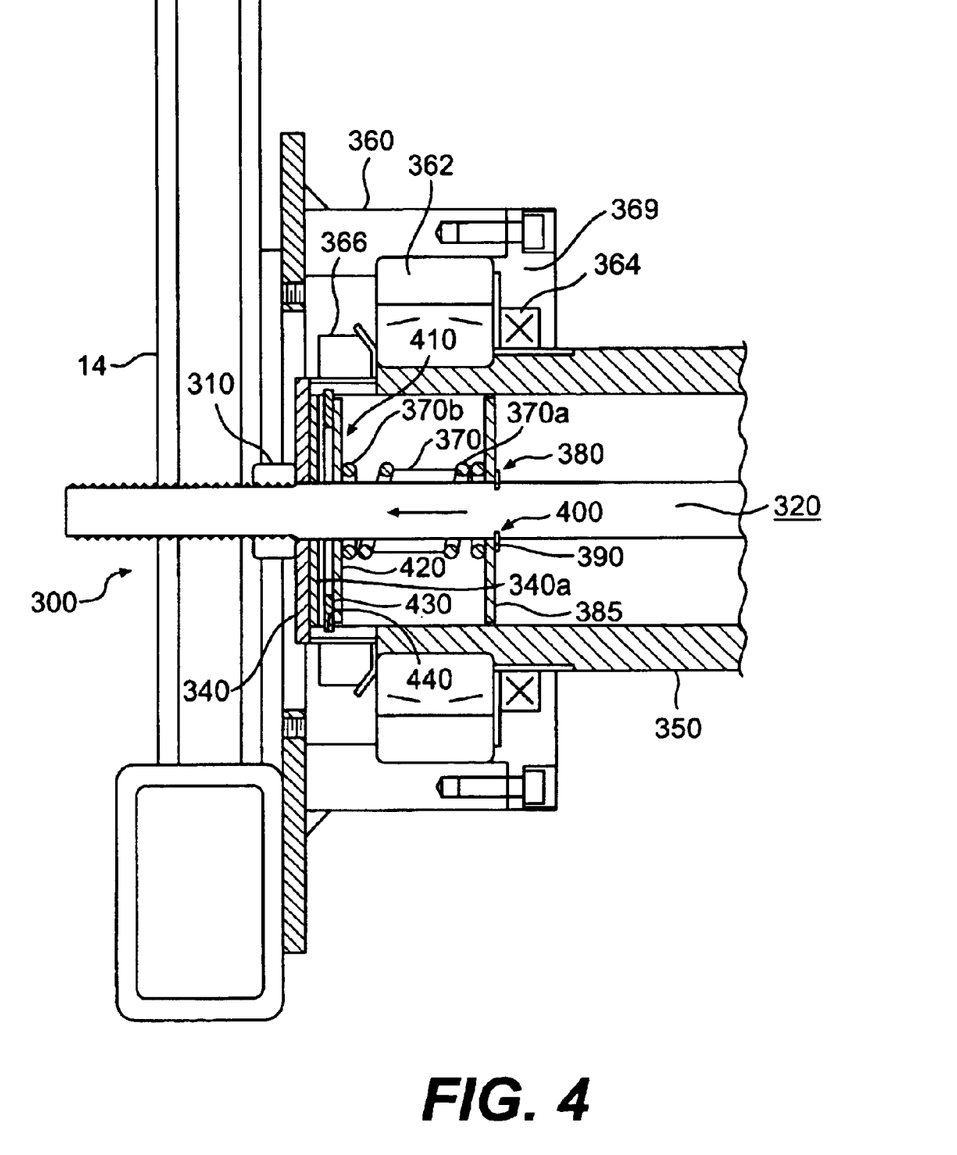
FIG. 4 is a partial, enlarged cross-sectional side view of the controller of FIG. 3 in a disengaged position.

FIGS. 3 and 4 illustrate a partial view of an alternative, preferred embodiment of the present invention that is similar to the previously-described embodiment but has improved operation of the engagement controller. A redundant description of the identical features in each embodiment is omitted.

The disengagement controller 300 of this embodiment differs from the engagement controller 121 of the previously-described embodiment in that a disengaging nut 310 of the disengagement controller 300 threads onto a disengaging rod 320 inside a bearing housing access plate 330, rather than outside the bearing housing access plate 120 as in the previously-described engagement controller 121.

FIG. 3 illustrates the engaged position of the engagement controller 300. In this position, the disengaging rod 320 is shifted to the right as viewed in FIG. 3 to engage the clutch portion (not shown as it is identical to the previous embodiment). The disengaging nut 310 rests against an end plate (or end cap) 340 for a driveshaft 350. The end plate 340 preferably includes a circumferential shoulder 340a that centers the end plate 340 relative to the axis of the drive shaft 350. The end plate 340 may be held in place relative to the driveshaft 350 by the disengaging nut 310 or otherwise attached to the driveshaft 350. Because both the disengaging nut 310 and the end plate 340 rotate in common with the driveshaft 350, a low-friction washer need not be placed between the disengaging nut 310 and the end plate 340. When the engagement controller 300 is engaged, the disengaging nut 310 may be removed altogether.

As in the previous embodiment, the driveshaft 350 is retained in a bearing housing 360, which is supported by the frame 14 (shown in FIG. 2). A rotational bearing 362 and a thrust bearing 364 connect between the driveshaft 350 and the bearing housing 360. A locknut 366 threads onto the end of the driveshaft 350 to hold the driveshaft 350 axially against the bearings 362, 364. A bearing housing cover 369 bolts to and forms a part of the bearing housing 360. A resilient seal 368, which may comprise a Teflon® tube, is disposed between the outer surface of the driveshaft 350 and an inner surface of the bearing housing cover 369. Together, the seal 368 and cover 369 seal the right side of the bearing housing 360. Of course, other seal and bearing arrangements may be used and remain within the scope of this invention.

The bearing housing access plate 330 bolts onto the bearing housing 360 to seal the left side of the bearing housing 360 and discourage dirt and other debris from entering the bearing housing 360 and/or engagement controller 300. The bearing housing access plate 330 may also serve as an additional safety device that ensures that the disengagement controller 300 remains engaged while the access plate 330 is attached to the bearing housing 360.

As in the previous embodiment, the engagement controller 300 includes a resilient member such as a reengagement spring 370 that operatively connects between the driveshaft 350 and the disengaging rod 320 to urge the clutch shaft 110 (not shown in this embodiment) into the engaged position by urging the disengagement rod 320 to the right as illustrated in FIGS. 3 and 4. A first end 370a of the spring 370 abuts against a stop member 380 that is connected to the disengaging rod 320 at a predetermined axial position on the disengaging rod 320. In the illustrated embodiment, the stop member 380 includes a washer 385 that is axially sandwiched between the first spring end 370a and a snap-ring 390 that locks into a circumferential groove 400 in the outer circumferential surface of the disengaging rod 320. Similarly, a second end 370b of the spring 370 abuts against a stop member 410 that is connected to the driveshaft 350 at a predetermined axial position. In the illustrated embodiment, the stop member 410 includes a washer 420 that is axially sandwiched between the second spring end 370b and a snap-ring 430 that locks into a circumferential groove 440 in the inner circumferential surface of the hollow driveshaft 350. Alternatively, if the end plate 340 is rigidly fixed to the driveshaft 350, the stop member 410 may be omitted such that the second end 370b of the spring 370 simply abuts an inside surface of the end plate 340.

FIG. 4 illustrates the engagement controller 300 in its disengaged position, wherein the disengaging rod 320 is shifted to the left (relative to the position shown in FIG. 3) and the clutch shaft 110 is disengaged. To disengage the engagement controller 300 and clutch shaft 110, an operator first removes the bearing housing access plate 330 (see FIG. 3). The operator then rotates the disengaging nut 310 relative to the disengaging rod 320 to push the disengaging rod 320 leftward relative to the disengaging nut 310 despite the counteracting reengaging force of the reengagement spring 370. The end plate 340 prevents the disengaging nut 310 from, itself, shifting to the right.

The present invention offers several advantages over prior art hydrostatic-motor-driven vehicles. When the clutch mechanism of the present invention is in the disengaged position, the tracks 18, 20 can move thus turning the driveshaft 60 without transmitting that rotation to the output shaft 42. Accordingly, the vehicle 10 may be easily towed without harming the hydrostatic motor 34, hydrostatic circuit, or brakes 50. Because the output shaft of the motor 34 is not engaged with the driveshaft 60, towing-induced rotation of the tracks 18, 20 does not rotate, wear, or damage the motor 34. Consequently, hydraulic fluid is not forcibly pumped through the hydrostatic circuit during towing. Finally, because the brake 50 is operatively connected to the output shaft 42 rather than the driveshaft 60, the brake 50 need not be disengaged to allow the vehicle 10 to be freely towed. Additionally, disengagement and reengagement may be easily and quickly accomplished by any operator.

While the clutch mechanism in the illustrated embodiments employs an axially-moving splined clutch shaft, various other types of clutch mechanisms that would be known to those skilled in the art could also be used without deviating from the scope of the present invention.

The hydrostatic motor 34 is preferably a low-speed, high-torque motor that allows the motor 34 to drive the driveshaft 60 without the need for intermediate gear reduction mechanisms. Nonetheless, the clutch mechanism according to the present invention may be used in a vehicle with a gear reduction mechanism. In such a vehicle, the clutch mechanism may be disposed anywhere along a rotation transfer path between the hydrostatic motor and the driveshaft of the vehicle.

The foregoing detailed embodiment is provided to illustrate the structural and functional principles of the present invention and is not intended to be limiting. To the contrary, the principles of the present invention are intended to encompass any and all changes, alterations and/or substitutions within the spirit and scope of the following claims.

What is claimed is:

1. A vehicle comprising:
    a frame;
    a hydrostatic motor mounted to the frame, the hydrostatic motor having an output shaft;
    a drive system supported by the frame;
    a driveshaft connected to the drive system; and
    a clutch mechanism disposed between the output shaft and the driveshaft, the clutch mechanism having (a) an engaged position in which the driveshaft and the output shaft are rotationally engaged with each other, and (b) a disengaged position in which the driveshaft and the output shaft are rotationally disengaged from each other,
    wherein the driveshaft and the output shaft have a common rotational axis, and wherein a first axially-extending spline is disposed on the driveshaft, and wherein a second axially-extending spline is disposed on the output shaft, and wherein the clutch mechanism comprises a clutch shaft having a third axially-extending spline, the clutch shaft being selectively movable along the rotational axis, the first and second splines rotationally engaging the third spline when the clutch mechanism is in the engaged position, the third spline being disengaged from one of the first and second splines when the clutch mechanism is in the disengaged position.

2. The vehicle of claim 1, wherein the clutch mechanism further comprises:
    a disengaging rod having a first portion connected to the clutch shaft and a second portion;
    a disengaging member connected to the second portion of the disengaging rod,
    wherein selective movement of the disengaging member in a disengaging direction moves the clutch shaft axially, thereby disengaging the clutch shaft from the output shaft.

3. The vehicle of claim 2, wherein the disengaging member is prevented from being less than a predetermined axial distance from the output shaft.

4. The vehicle of claim 3, further comprising a plate connected to the driveshaft at a fixed axial position relative to the output shaft,
    wherein when the disengaging member abuts the plate, the plate prevents the disengaging member from being less than the predetermined axial distance from the output shaft.

5. The vehicle of claim 2, wherein the second portion of the disengaging rod is threaded, and wherein the disengaging member is a nut threaded onto the second portion, and wherein the selective movement of the disengaging nut comprises selective rotational movement.

6. The vehicle of claim 2, wherein the clutch mechanism further comprises a resilient member having first and second portions, the first portion being disposed at a fixed axial position relative to the driveshaft, the second portion being disposed at a fixed axial position relative to the clutch shaft, the resilient member applying an engaging force to the clutch shaft that tends to move the clutch shaft into engagement with the output shaft, and wherein when the clutch mechanism is in the disengaged position, movement of the disengaging member in an engaging direction allows the resilient member to apply the engaging force to the clutch shaft.

7. The vehicle of claim 6, further comprising:
    a first stop member connected to the driveshaft at a predetermined axial position on the driveshaft, the first stop member engaging the first portion of the resilient member; and
    a second stop member connected to the disengaging rod at a predetermined axial position on the disengaging rod, the second stop member engaging the second portion of the resilient member.

8. A hydrostatic motor mounting assembly comprising:
    a hydrostatic motor having an output shaft;
    a driveshaft; and
    a clutch mechanism disposed between the output shaft and the driveshaft, the clutch mechanism having (a) an engaged position in which the driveshaft and the output shaft are rotationally engaged with each other, and (b)

a disengaged position in which the driveshaft and the output shaft are rotationally disengaged from each other, wherein the driveshaft and the output shaft have a common rotational axis, and wherein a first axially-extending spline is disposed on the driveshaft, and wherein a second axially-extending spline is disposed on the output shaft, and wherein the clutch mechanism comprises a clutch shaft having a third axially-extending spline, the clutch shaft being selectively movable along the rotational axis, the first and second splines rotationally engaging the third spline when the clutch mechanism is in the engaged position, the third spline being disengaged from one of the first and second splines when the clutch mechanism is in the disengaged position.

9. The hydrostatic motor mounting assembly of claim 8, wherein the clutch mechanism further comprises:

a disengaging rod having a first portion connected to the clutch shaft and a second portion;

a disengaging nut connected to the second portion of the disengaging rod and disposed a fixed distance from the output shaft, wherein selective rotation of the disengaging nut in a disengaging direction moves the clutch shaft axially, thereby disengaging the clutch shaft from the output shaft.

10. The hydrostatic motor mounting assembly of claim 9, further comprising a plate connected to the driveshaft at a fixed axial position relative to the output shaft, wherein when the disengaging nut abuts the plate, the plate prevents the disengaging nut from moving axially closer the output shaft.

11. The hydrostatic motor mounting assembly of claim 10, wherein a stop member is attached at a fixed position to the disengaging rod, and wherein the clutch mechanism further comprises a resilient member disposed between the plate and the stop member, the resilient member applying an engaging force to the clutch shaft that tends to move the clutch shaft into engagement with the output shaft, and wherein when the clutch mechanism is in the disengaged position, rotation of the disengaging nut in an engaging direction allows the resilient member to apply the engaging force to the clutch shaft.

12. A motor mounting assembly comprising:

a low speed, high torque motor having an output shaft;

a driveshaft selectively rotationally connected to the output shaft; and a disengaging mechanism connected between the output shaft and the driveshaft including
an axially moveable shaft engageable between the output shaft and the driveshaft,
a connecting rod coupled between the moveable shaft and the driveshaft,
a biasing mechanism secured to the driveshaft and the connecting rod that biases the moveable shaft toward the output shaft, and
an engagement device coupled to the connecting rod to selectively move the connecting rod relative to the driveshaft and thereby selectively engage and disengage the driveshaft and the output shaft.

13. A motor mounting assembly comprising:

a low speed, high torque motor having an output shaft;

a driveshaft selectively rotationally connected to the output shaft; and a disengaging mechanism connected between the output shaft and the driveshaft including
an axially moveable shaft engageable between the output shaft and the driveshaft,
a connecting rod coupled between the moveable shaft and the driveshaft,
a biasing mechanism secured to the driveshaft and the connecting rod that biases the moveable shaft toward the output shaft, and
an engagement device coupled to the connecting rod to selectively move the connecting rod relative to the driveshaft and thereby selectively engage and disengage the driveshaft and the output shaft, wherein the driveshaft and the output shaft have a common rotational axis, and wherein a first axially-extending spline is disposed on the driveshaft, and wherein a second axially-extending spline is disposed on the output shaft, and wherein a third axially-extending spline is disposed on the axially moveable shaft, the axially moveable shaft being selectively movable along the rotational axis, the first and second splines rotationally engaging the third spline when the driveshaft is rotationally connected to the output shaft, the third spline being disengaged from one of the first and second splines when the driveshaft is not rotationally connected to the output shaft.

14. The motor mounting assembly of claim 12, wherein the biasing mechanism comprises a resilient member having first and second portions, the first portion being disposed at a fixed axial position relative to the driveshaft, the second portion being disposed at a fixed axial position relative to the moveable shaft, the resilient member applying an engaging force to the moveable shaft that tends to move the moveable shaft into engagement with the output shaft, and wherein when the disengaging mechanism is in the disengaged position, movement of the engagement device in an engaging direction allows the resilient member to apply the engaging force to the axially-movable shaft.

15. A motor mounting assembly comprising:

a low speed, high torque motor having an output shaft;

a driveshaft selectively rotationally connected to the output shaft; and a disengaging mechanism connected between the output shaft and the driveshaft including
an axially moveable shaft engageable between the output shaft and the driveshaft,
a connecting rod coupled between the moveable shaft and the driveshaft,
a biasing mechanism secured to the driveshaft and the connecting rod that biases the moveable shaft toward the output shaft, and
an engagement device coupled to the connecting rod to selectively move the connecting rod relative to the driveshaft and thereby selectively engage and disengage the drive shaft and the output shaft, wherein the engagement device is a disengaging nut connected to a threaded end of the connecting rod, and wherein selective rotation of the disengaging nut in a disengaging direction moves the moveable shaft axially, thereby disengaging the moveable shaft from the output shaft.

* * * * *